T. J. PRICE.
Straw Cutter.
No. 52,199. Patented Jan'y 23, 1866.
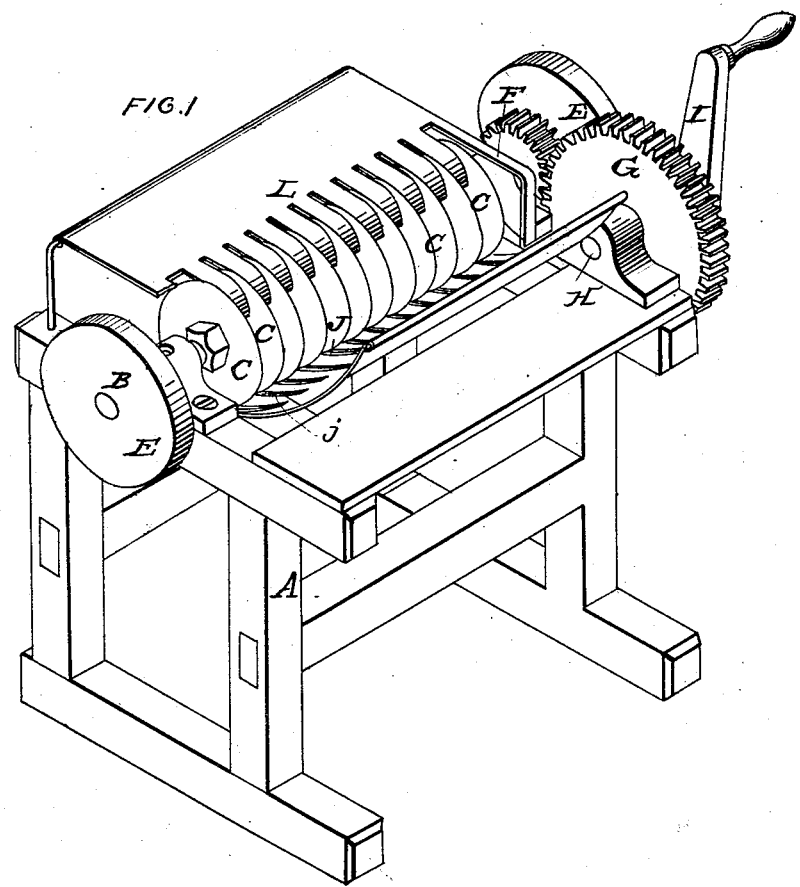
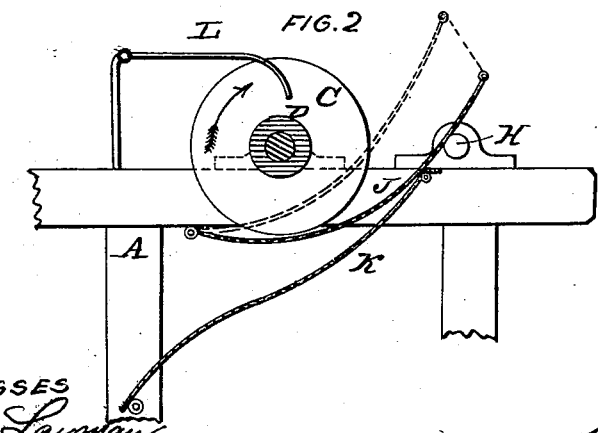
WITNESSES
INVENTOR

UNITED STATES PATENT OFFICE.

THOMAS J. PRICE, OF AUBURN, KENTUCKY.

IMPROVEMENT IN STRAW-CUTTERS.

Specification forming part of Letters Patent No. 52,199, dated January 23, 1866.

*To all whom it may concern:*

Be it known that I, THOMAS J. PRICE, of Auburn, Logan county, Kentucky, have invented a new and useful Straw-Cutter; and I do hereby declare the following to be a full, clear, and exact description thereof, reference being had to the accompanying drawings, making part of this specification.

My invention relates to a simple, rapid, and effective device for reducing straw, hay, and other fodder to what is called "chopped feed."

Figure 1 is a perspective view of a machine embodying my invention. Fig. 2 is a transverse section through the cutting apparatus.

A suitable frame, A, supports a horizontal shaft, B, armed with a series of circular knives, C, maintained at a suitable distance by means of collars D.

E are fly-wheels to preserve an equable rotation of the shaft B. F is a pinion on the shaft B, meshing with a spur-wheel, G, whose shaft H is provided with a winch, I, by which the machine is operated.

J is a trough, apron, or cradle of the represented curved form and hinged by its lower edge to the frame. The said apron J is traversed by a series of slots, $j$, for the knives C to play in. When at rest the apron J is supported by the upper edge of a chute, K, which serves to discharge the cut feed.

Rigidly attached to the frame is a series of fingers, L, which serve to clean the knives and to keep them from clogging.

Operation: Hay, straw, or other fodder is supplied to the apron J. The knives are then rotated in direction of the arrow, and the apron is lifted up so as to bring all of the fodder in turn under the action of the knives.

I claim herein as new and of my invention—

1. The series of circular revolving knives C and hinged rack or apron J, for the purpose set forth.

2. In the described combination, the series of circular revolving knives C, hinged rack or apron J, and fingers L.

In testimony of which invention I hereunto set my hand.

THOS. J. PRICE.

Witnesses:
B. D. HARDY,
W. T. PRICE.